April 9, 1940.  E. G. SIMPSON  2,196,478

OPERATING AND LATCHING DEVICE FOR SWINGING WINDOW PANELS

Filed Dec. 30, 1938  2 Sheets-Sheet 1

INVENTOR.
Emory Glenn Simpson
BY
Barnes, Kisselle, Laughlin & Raisch
ATTORNEYS

April 9, 1940.  E. G. SIMPSON  2,196,478
OPERATING AND LATCHING DEVICE FOR SWINGING WINDOW PANELS
Filed Dec. 30, 1938  2 Sheets-Sheet 2
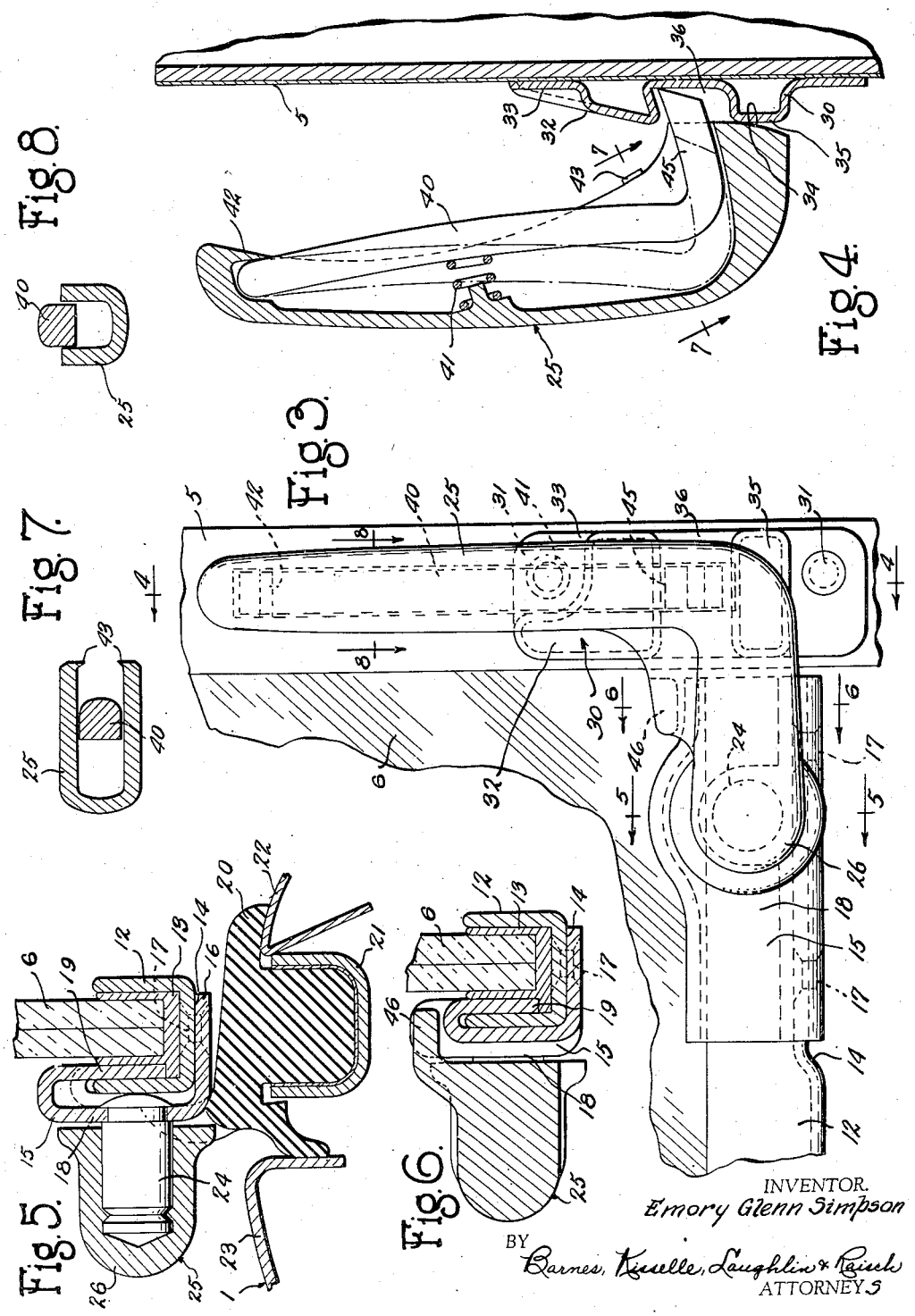
INVENTOR.
Emory Glenn Simpson
BY
Barnes, Kisselle, Laughlin & Raisch
ATTORNEYS Patented Apr. 9, 1940

2,196,478

UNITED STATES PATENT OFFICE

2,196,478

OPERATING AND LATCHING DEVICE FOR SWINGING WINDOW PANELS

Emory Glenn Simpson, Detroit, Mich., assignor to Ternstedt Manufacturing Company, Detroit, Mich., a corporation of Michigan Application December 30, 1938, Serial No. 248,574

5 Claims. (Cl. 292—210)

This invention relates to the operating and latching structure of pivoted ventilating windows or panels of automobile bodies.

The invention is concerned principally with an arrangement where the pivoted panel is operated by the direct application of forces. To this end a handle is pivotally mounted on the panel, or the frame confining the edges of the panel, by means of which the panel is swung so that it may be opened or closed. When in closed position the handle is turned on its pivot so that a portion thereof moves beyond an adjacent and fixed structural element to lock the panel closed. In this connection an inclined plane, or what may be termed a cam, cooperates with the handle so that as the handle is turned to lock the panel closed the panel is tightened in position by the action of the inclined plane or cam.

One difficulty in an arrangement of this kind is that the structure affords relatively easy access to the interior of the vehicle. For instance, a wire or the like may be passed into the vehicle through a slot or opening, and by means of a loop or hook on the wire the handle may be engaged and turned so as to unlock the swinging panel. One object of this invention is to provide an improved latching arrangement for latching the pivoting handle in panel-locking position. This latch arrangement is such that it may be engaged to be unlatched by the fingers or hand of the operator when the operator places the hand in a natural position for turning the handle, while at the same time the latching arrangement is so arranged and partially concealed that it is not feasible to cause an unlatching action by some instrument or length of wire which is passed into the vehicle.

One structure for carrying out the invention is disclosed in the accompanying drawings, and in these drawings:

Fig. 3 is an enlarged elevational view of the operating lever showing portions of the pivoted panel and showing some of the structure in dotted lines.

Fig. 4 is a cross sectional view taken substantially on line 4—4 of Fig. 3.

Fig. 5 is a sectional view taken substantially on line 5—5 of Fig. 3 showing the lower edge of the pivoted panel and a cooperating weatherstrip.

Fig. 6 is a sectional view taken substantially on line 6—6 of Fig. 3.

Fig. 7 is a cross sectional view taken through the handle and latch substantially on line 7—7 of Fig. 4.

Fig. 8 is a cross sectional view taken through the handle and latch substantially on line 8—8 of Fig. 3.

Figure 1:
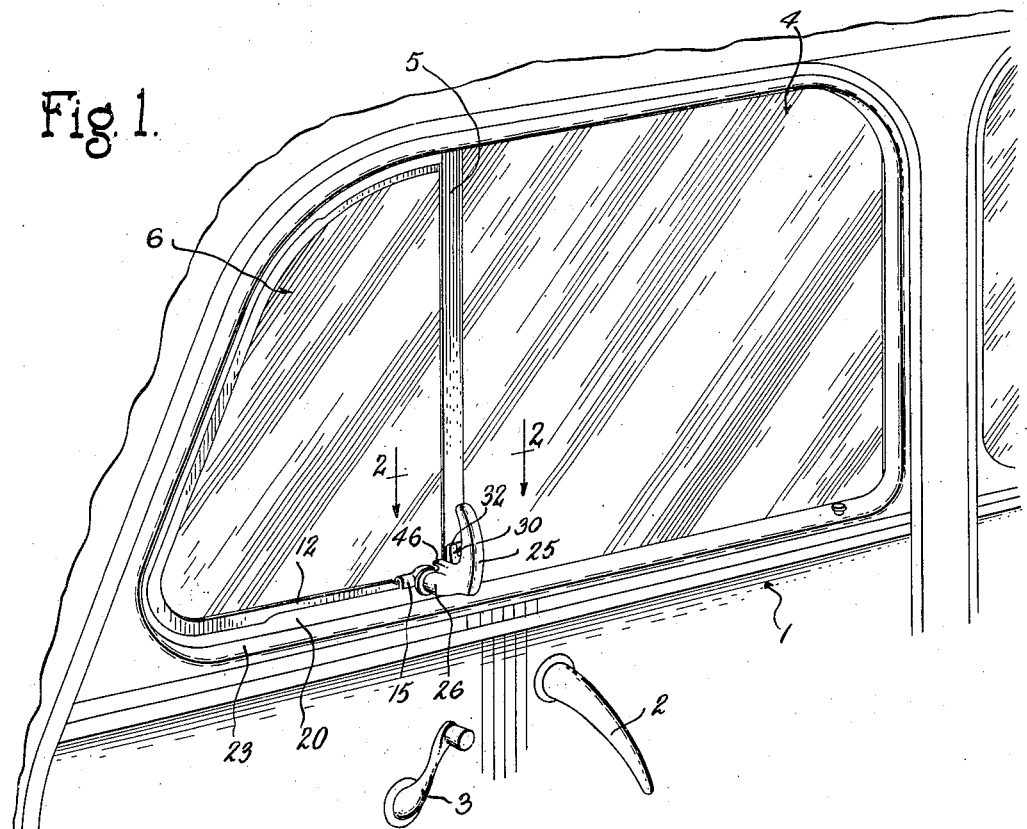
Fig. 1 is a general view of a perspective nature showing a portion of the inside of a closed body of a vehicle.

In Fig. 1 the door of a vehicle is generally illustrated at 1 having the usual handle 2 for operating the door latch bolt, and a handle 3 for slidably raising and lowering the window panel 4. The window opening in the door is divided by a division strip 5 so that the sliding panel 4 closes part of the opening and a pivoted ventilating window panel 6 closes the other part of the opening. The panel 6 pivots substantially on a vertical axis.

Figure 2:
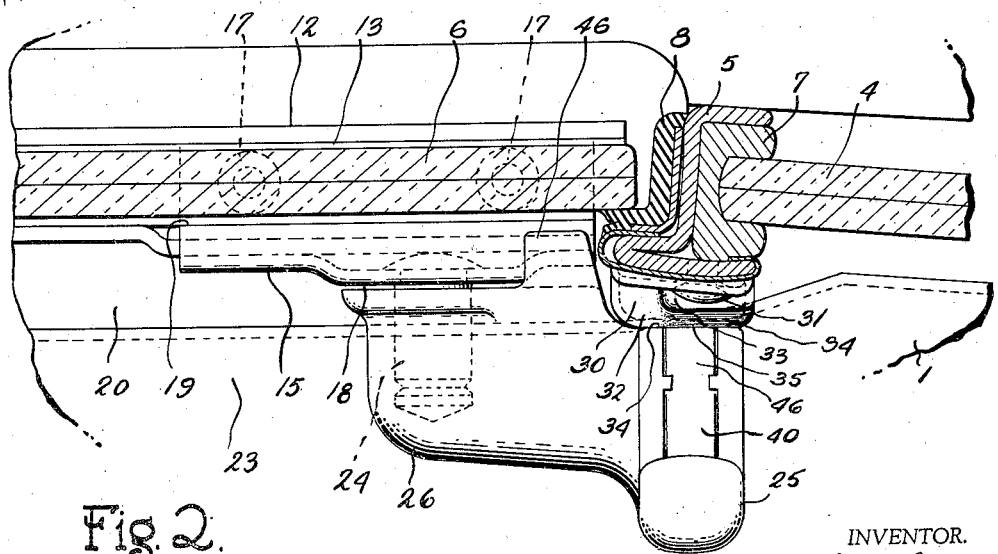
Fig. 2 is an enlarged cross sectional view taken substantially on line 2—2 of Fig. 1.

The division strip, as shown in Fig. 2, is shaped to hold a guide channel 7 for the sliding window 4 and it has a weatherstrip 8 against which the panel 6 abuts. The edge of the panel 6 swings upwardly (as Fig. 2 is viewed) when the panel 6 is opened, this upwardly swinging edge being the rear edge of the panel.

By reference to Fig. 5 it will be noted that the lower edge of the panel 6 is confined in sheet metal channel 12 with intervening packing or sealing material 13. Adjacent the rear edge of the panel 6 the channel 12 is reduced in dimensions as shown at 14, and a sheet metal supporting element is fastened thereto, this element being illustrated generally at 15. The element 15 has a portion 16 underlying the channel and riveted thereto as illustrated at 17; it has a substantially vertical portion 18 extending along the side of the channel and a depending lip 19. The door structure which bounds the lower edge of the window opening is provided with a weatherstrip 20 which may lie in a supporting channel 21 and seals against the outside structure 22 and the inside structure 23.

An operating lever advantageously of L-shape is illustrated at 25 and it is pivotally mounted to the support 15. To this end a stud 24 may be riveted to the portion 18 and a hub portion 26 of the handle is pivotally mounted thereon. As will be noted by reference to Fig. 3, the hub is substantially at one end of one arm of the L, while the other arm of the L, which stands vertically as illustrated when in locked position, serves as a handle.

Mounted on the division strip 5 is a plate generally illustrated at 30, attached to the division strip by screws or rivets 31. This plate is formed with an inclined surface 32 which, however, may be depressed as at 33 for the reception of one of the attaching means 31. The lever has, substantially at its bend line, a suitable surface 34 arranged to ride up the incline or cam 32 to tighten the panel into closed position and to ultimately rest upon the top surface 35 of the plate. This plate also constitutes a portion of a latch structure and is formed with a depression 36 which constitutes a keeper for the latch. The surface 34 is of such dimensions as to ride over the open end of the keeper or recess 36.

The handle is of U-shape in cross section shown in Figs. 7 and 8, and the U-formation may gradually increase in depth with increase in the thickness of the handle. The U-formation opens through the surface 34. A latch 40 in the form of an L-shaped member lies within the U-formation and is acted upon by a spring 41. One end of the latch is retained in position by an overhanging part of the handle as illustrated at 42, which may be provided by peening over the metal, and is retained in position adjacent its other end by inwardly extending projections 43. Thus the latch is rather freely mounted and is positioned bodily outwardly by the spring, but is retained in position by the elements 42 and 43. The other arm of the L-shaped latch which is illustrated at 45 is arranged to be projected out through the open U where the U-formation opens through the surface 34 to thus engage in the keeper recess 36 as illustrated in Fig. 4. The other portion of the latch and the U-shaped structure of the handle are so relatively formed that this portion of the latch is exposed or projects somewhat out of the U form, as illustrated in Figs. 4 and 8. The handle is preferably also equipped with a lug 46 which extends inwardly so as to overlie the channel 12 and the support 15, as illustrated in Figs. 2 and 6. This limits movement of the handle as it is rotated in a direction for locking the panel closed. The support 15 is suitably enlarged in its intermediate portion for the reception of the stud 24 and hub 26.

The operation of the structure is as follows: The handle and latch are shown in locked position. In order to open the panel the handle 25 is grasped by the hand or fingers, at which time the hand or fingers are in contact with the latch 40, and by a squeezing action the spring 41 is compressed and the latch moves more or less pivotally around the end confined by the portion 42 so that the detent 45 is retracted from the keeper recess. The handle may now be turned counter-clockwise, as Fig. 3 is viewed, and when it is in approximately a horizontal position, it is free of the division strip 5, and by the application of suitable pressure outwardly the panel 6 is swung on its pivot to an open position. To close the window the handle is again grasped and the panel pulled to closed position and then the handle is rotated clockwise as Figs. 1 and 3 are viewed. In this movement the surface 34 rides up the incline 32 and draws the panel tightly closed against the weatherstrip. When the ultimate position is reached, as shown in Fig. 4, the detent snaps into the recess 36. It will be noted that the reduced portion of the inclined surface adjacent the depressed part 33 is substantially on a radius equal to that of the radius of the surface 34 so that the surface 34 may cooperate with the inclined surface throughout its length. The depressed area 33 would not function on the surface 34, even were it not depressed. The surface 34 is large enough to bridge and ride over the recess 36.

It will be observed how easily the latch is manipulated by the natural position of the hand and fingers. At the same time, the latch is substantially concealed, and in any event is not so exposed that a tool can be applied to it. As a result, the presence of the swinging panel does not reduce the effectiveness of the locking of the car. The locking action is entirely automatic in that any time the operating handle is swung to close the window, the latch automatically functions to lock the handle in position.

I claim:

1. In an automobile body having a window opening and a swinging window panel, an operating member pivotally mounted on the panel, said operating member having a handle and having a part projectable beyond the window opening upon pivotal movement thereof to engage a fixed portion of the body to hold the panel closed, said handle being of U-shape in cross section with the U opening toward the panel, a spring pressed latch disposed within the U-shape of the handle and movably mounted therein, said latch having a detent, and means providing a keeper for the detent, said latch having a part movable in a direction into the U-formation of the handle to disengage the detent from the keeper.

2. In an automobile body having a window opening and a swinging window panel, an operating member pivotally mounted on the panel, said operating member having a handle and having a part projectable beyond the window opening upon pivotal movement thereof to engage a fixed portion of the body to hold the panel closed, said handle being of U-shape in cross section with the U opening toward the panel, an L-shaped latch having one arm disposed in the U-shape of the handle and one arm constituting a detent and extending in the direction of the axis of the operating member, means holding the latch member substantially within the U-formation, a spring between the bight portion of the handle and the first mentioned arm of the latch, and means providing a keeper for the detent, the first mentioned arm of the latch being engageable and movable in a direction into the U formation upon engagement of the handle to shift the detent out of the keeper.

3. In an automobile body having a window opening and a swinging window panel, an operating member pivotally mounted on the panel, said operating member having a handle and having a part projectable beyond the window opening upon pivotal movement thereof to engage a fixed portion of the body to hold the panel closed, said handle being U-shape in cross section with the U opening toward the panel, a latch member having a part extending lengthwise of the handle and disposed substantially in the U-formation and having an angularly extending part serving as a detent, a spring between the back of the U-formation and the first mentioned part, some of the metal of the handle being fashioned inwardly of the legs of the U-formation to overlie the latch and hold it in position, and means on the fixed portion of the body providing a keeper for the detent, said detent being retractable from the keeper by pressure applied to the first mentioned part of the latch.

4. In an automobile body having a window opening, a swinging window panel for part of the opening, a sliding window panel for another part of the opening and a division strip between the panels, a substantially L-shaped operating member, means pivotally mounting the operating member to the panel substantially at one end of one leg of the L, the other leg of the L serving as a handle, the angle portion of the L being arranged to overlap the division strip upon pivotal movement of the operating member, said handle being U-shaped in cross section, a latch having a portion disposed in the U-formation and a projecting portion serving as a detent, a plate secured to the division strip and having an inclined surface upon which the angle portion of the L functions to clamp the swinging panel into closed position, said plate being formed as a recess serving as a keeper for the detent.

5. In an automobile body having a window opening, a swinging window panel for part of the opening, a sliding window panel for another part of the opening and a division strip between the panels, a substantially L-shaped operating member, means pivotally mounting the operating member to the panel substantially at one end of one leg of the L, the other leg of the L serving as a handle, the angle portion of the L being arranged to overlap the division strip upon pivotal movement of the operating member, said handle being U-shaped in cross section, a latch having a portion disposed in the U-formation and a projecting portion serving as a detent, a plate secured to the division strip and having an inclined surface upon which the angle portion of the L functions to clamp the swinging panel into closed position, said plate being formed as a recess serving as a keeper for the detent, said recess substantially underlying the angle portion of the L when the operating member is in locked position and said angle portion having a surface of such extent as to bridge and ride over said recesses.

EMORY GLENN SIMPSON.